United States Patent
Mohamed et al.

(10) Patent No.: US 11,586,324 B2
(45) Date of Patent: Feb. 21, 2023

(54) TOUCH SENSING METHOD AND TOUCH SENSING DEVICE

(71) Applicant: SILICON WORKS CO., LTD., Daejeon (KR)

(72) Inventors: Mohamed Gamal Ahmed Mohamed, Daejeon (KR); Young Ju Park, Daejeon (KR); Sun Young Park, Daejeon (KR)

(73) Assignee: Silicon Works Co., Ltd., Daejeon (KR)

( * ) Notice: Subject to any disclaimer, the term of this patent is extended or adjusted under 35 U.S.C. 154(b) by 0 days.

(21) Appl. No.: 17/404,827

(22) Filed: Aug. 17, 2021

(65) Prior Publication Data

US 2022/0057913 A1 Feb. 24, 2022

(30) Foreign Application Priority Data

Aug. 19, 2020 (KR) .................. 10-2020-0103727

(51) Int. Cl.
*G06F 3/041* (2006.01)
*G06F 3/044* (2006.01)

(52) U.S. Cl.
CPC ........ *G06F 3/04186* (2019.05); *G06F 3/0446* (2019.05)

(58) Field of Classification Search
CPC ............... G06F 3/04186; G06F 3/0446; G06F 3/04166; G06F 3/0445; G06F 3/0447
See application file for complete search history.

(56) References Cited

U.S. PATENT DOCUMENTS

| | | | | |
|---|---|---|---|---|
| 9,182,848 B2* | 11/2015 | Oh | .......................... | G06F 3/044 |
| 10,649,666 B1* | 5/2020 | Shih | ...................... | G06F 3/0611 |
| 2009/0196508 A1* | 8/2009 | Sullender | ............. | G06V 10/457 382/201 |
| 2011/0102339 A1* | 5/2011 | Lin | ...................... | G06F 3/04166 345/173 |
| 2011/0169763 A1* | 7/2011 | Westerman | ............. | G06T 7/155 345/173 |
| 2013/0009896 A1* | 1/2013 | Zaliva | ................. | G06F 3/04883 345/173 |
| 2013/0057507 A1* | 3/2013 | Shin | ....................... | G06F 3/0443 345/174 |
| 2013/0141344 A1* | 6/2013 | Oh | ........................ | G06F 3/0416 345/173 |
| 2013/0336524 A1* | 12/2013 | Zhang | .................... | G06V 10/85 382/103 |
| 2014/0225863 A1* | 8/2014 | Tanaka | ................ | G06F 3/04164 345/174 |
| 2015/0378497 A1* | 12/2015 | Ningrat | ................... | G06F 3/044 345/174 |

FOREIGN PATENT DOCUMENTS

KR 10-2019-0009033 A 1/2019

\* cited by examiner

*Primary Examiner* — Ibrahim A Khan
(74) *Attorney, Agent, or Firm* — Fenwick & West LLP

(57) ABSTRACT

The present disclosure relates to a technology for assigning group labels during touch sensing, and more particularly to a technology for preventing two adjacent objects from receiving a same group label by searching for a valley when group labels are assigned and this allows labeling without performing any object separation process.

14 Claims, 12 Drawing Sheets

*FIG. 13*

|  | 5 fingers | 10 fingers |
|---|---|---|
| New solution | 0.51 (U) | 2.28 (U) |
| Old solution | 1.77 (U) | 4.41 (U) |
| Time reduction | 71.1% | 48.3% |

TOUCH SENSING METHOD AND TOUCH SENSING DEVICE

CROSS REFERENCE TO RELATED APPLICATION

This application claims priority from Republic of Korea Patent Application No. 10-2020-0103727, filed on Aug. 19, 2020, which is hereby incorporated by reference in its entirety.

BACKGROUND

1. Field of Technology

The present disclosure relates to a technology for sensing a touch cell disposed on a panel.

2. Description of the Prior Art

In general, a location sensor is used as an input device of a computer, Personal Digital Assistants (PDA), a media player, a video game player, a home appliance, a cordless phone, a public phone, a Point of Sales (POS) terminal, an automated teller machine, or the like. One of types of location sensors generally used in such an application field is a touch sensor and is easily found in, for example, an input device of a notebook computer. In general, a user operates a touch sensor by moving a finger, a stylus, or another stimulation device near a detection area of the touch sensor. The stimulation device may generate capacitive, inductive, or other electrical effects by a carrier signal applied to the detection area, and a location or proximity of the stimulation device for the detection area may be detected through the carrier signal. Location information detected by the touch sensor may be used to move a cursor or another indicator on a display screen or to scroll a text element on the screen, or used for the purpose of another user interface.

Although the touch sensor has been used for several years, engineers are continuously seeking a design alternative for reducing the cost and improving the performance of the touch sensor. Particularly, people pay considerable attention to reduction in influence on noise generated by a display screen, a power source, wireless frequency interference, and/or another source outside the sensor. Various sampling, filtering, signal processing, shielding, and other noise reduction technologies have been successfully implemented at various levels.

A device for driving a touch sensor senses a plurality of touch sensors arranged on a panel and makes a touch image with sensing values. The device connects touch cells, which are connected to the same object, with each other in the touch image, and assign the same label to the connected touch cells. Such a labeling method provides a basis for generating touch coordinates in units of objects. The labeling method may be called a Connected Component Labeling (CCL) method.

Meanwhile, the conventional connected component labeling method had a problem in that a plurality of objects, which are adjacent to each other but are different from each other, are recognized as one object. In order to solve the problem, the prior art further includes an object separation operation for separating one object into two or more objects, and such an additional operation may lengthen a processing time of the touch image.

SUMMARY OF THE INVENTION

In view of this background, the present disclosure is to provide a technology for more rapidly, effectively, and efficiently processing touch sensing values.

In accordance with an aspect of the present disclosure, a touch sensing device comprises: a sensing circuit configured to generate a sensing value for each touch cell; and a processor configured to, among touch cells, each having a sensing value larger than or equal to a first threshold value, classify touch cells, each having a sensing value difference of at least a second threshold value with adjacent touch cells, as a valley and to assign a same group label to touch cells which are not classified as the valley and are adjacent to each other.

The processor may classify touch cells, each having both a sensing value difference of at least the second threshold value with an adjacent touch cell in one side in one direction and a sensing value difference of at least the second threshold value with another adjacent touch cell in another side in the one direction, as the valley.

The processor may assign a group label to each touch cell in a raster scan direction and assign to a current touch cell a group label of a smallest number among group labels previously assigned to one adjacent touch cell in the same row as that of the current touch cell and to three adjacent touch cells in another row.

In accordance with another aspect of the present disclosure, a touch sensing method comprises: generating and storing a sensing value for each touch; assigning group labels to touch cells, each having a sensing value larger than or equal to a first threshold value and classifying touch cells, each having a sensing value difference of at least a second threshold value with adjacent touch cells, as a valley in a first scan for touch cells; and making the group labels of the adjacent ones, among the touch cells to which the group labels are already assigned, to conform to each other in a second scan for touch cells.

The touch sensing device may determine a group label for a touch cell by identifying group labels of touch cells adjacent to the touch cell being scanned.

In a case when group labels of at least two touch cells adjacent to a touch cell being scanned are different, the touch sensing device may determine a minimum value among the different group labels as a group label of the touch cell being scanned in a first scan.

The touch sensing device may store the different group labels in an equivalent (EQ) table in the first scan and make group labels of adjacent touch cells to conform to each other according to the EQ table in the second scan.

In accordance with another aspect of the present disclosure, a touch sensing device comprises: a sensing circuit configured to supply a driving signal to a panel and generate sensing values of touch cells arranged on the panel according to a response signal corresponding to the driving signal; a memory configured to store the sensing values and labels corresponding to respective touch cells; and a processor configured to assign group labels to touch cells, each having a sensing value larger than or equal to a first threshold value and to assign a label indicating a valley to touch cells, each having a sensing value difference of at least a second threshold value with adjacent touch cells in a first scan for touch cells, and to make the group labels of the adjacent ones, among the touch cells to which the group labels are already assigned, to conform to each other in a second scan for touch cells.

A label corresponding to each touch cell may be initialized to have a specific value, and subsequently, replaced with one of the group labels or replaced with the label indicating the valley in the first scan.

According to the embodiments as described above, it is possible to more rapidly, effectively, and efficiently process touch sensing values.

BRIEF DESCRIPTION OF THE DRAWINGS

FIG. 13 is a table showing a test result of a processing time of a method according to an embodiment and a method which is assumed as the prior art.

DETAILED DESCRIPTION OF THE EXEMPLARY EMBODIMENTS

Figure 1:
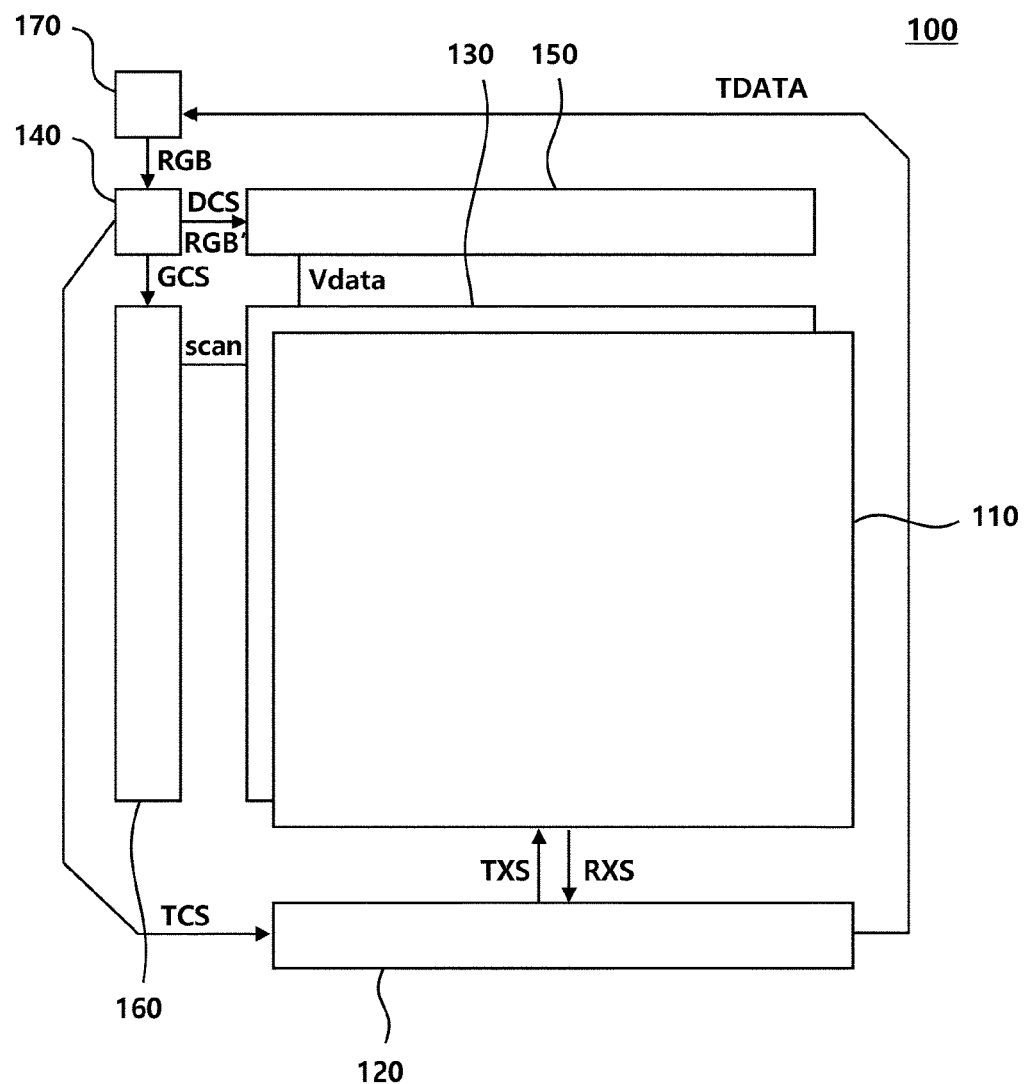
FIG. 1 is a block diagram illustrating a display device according to an embodiment.

FIG. 1 is a block diagram illustrating a display device according to an embodiment.

Referring to FIG. 1, a display device 100 may include a display panel 130, a gate driving device 160, a data driving device 150, a data processing device 140, a host 170, a touch panel 110, a touch sensing device 120, and the like.

The data driving device 150, the gate driving device 160, and the touch sensing device 120 may drive at least one element included in the display panel 130 or the touch panel 110. The data driving device 150 may drive data lines connected to pixels in the display panel 130, and the gate driving device 160 may drive gate lines connected to pixels. The touch sensing device 120 may drive touch electrodes disposed on the touch panel 110.

The data driving device 150 may supply a data voltage (Vdata) to data lines in order to display an image in each pixel of the display panel 130. The data driving device 150 may include at least one data driver integrated circuit. At least one data driver integrated circuit may be connected to a bonding pad of the display panel 130 in a Tape Automated Bonding (TAB) type or a Chip On Glass (COG) type, directly arranged on the display panel 130, or integrated and arranged on the display panel 130 according to the circumstances. Further, the data driving device 150 may be implemented in a Chip On Film (COF) type.

The gate driving device 160 may supply a scan signal to gate lines in order to turn on and off a transistor located in each pixel. The gate driving device 160 may be located at only one side of the display panel 130 as illustrated in FIG. 1 or may be divided into two and located at both sides of the display panel 130 according to an implementation scheme. Further, the gate driving device 160 may include at least one gate driver integrated circuit. At least one gate driver integrated circuit may be connected to a bonding pad of the display panel 130 in a Tape-Automated-Bonding (TAB) type or a Chip On Glass (COG) type, directly arranged on the display panel 130 in a Gate-In-Panel (GIP) type, or integrated and arranged on the display panel 130 according to the circumstances. Further, the gate driving device 160 may be implemented in a Chip-On-Film (COF) type.

The data processing device 140 may receive image data RGB from the host 170 and convert the image data to a format which can be recognized by the data driving device 150. The data processing device 140 may transmit the converted image data RGB to the data driving device 150.

The data processing device 140 may control timing of the driving devices 160, 150, and 120 through control signals GCS, DCS, and TCS. In such an aspect, the data processing device 140 may also be called a timing controller.

Touch electrodes may be arranged on the touch panel 110. The touch electrodes may include transmission electrodes and reception electrodes. The touch sensing device 120 may transmit a driving signal TXS to the transmission electrode and receive a response signal RXS from the reception electrode, so as to generate touch data TDATA. The touch sensing device 120 may transmit the touch data TDATA to the host 170. The transmission electrode and the reception electrode may be the same electrodes or different electrodes. When the transmission electrode and the reception electrode are different electrodes, the touch sensing device may sense a change in mutual capacitance between the transmission electrode and the reception electrode and recognize a touch. Such a touch sensing type may be called a mutual capacitive type. When the transmission electrode and the reception electrode are the same electrodes, the touch sensing device may sense a change in self capacitance of the transmission electrode or the reception electrode and recognize a touch. Such a touch sensing type may be called a self-capacitive type. The touch sensing device may acquire a sensing value for a touch cell disposed or arranged on the touch panel 110 through the mutual capacitive type or the self-capacitive type. A touch cell may be arranged at an intersection point of the transmission electrode and the reception electrode in the mutual capacitive type, and the transmission electrode or the reception electrode itself may be a touch cell in the self-capacitive type.

Figure 2:
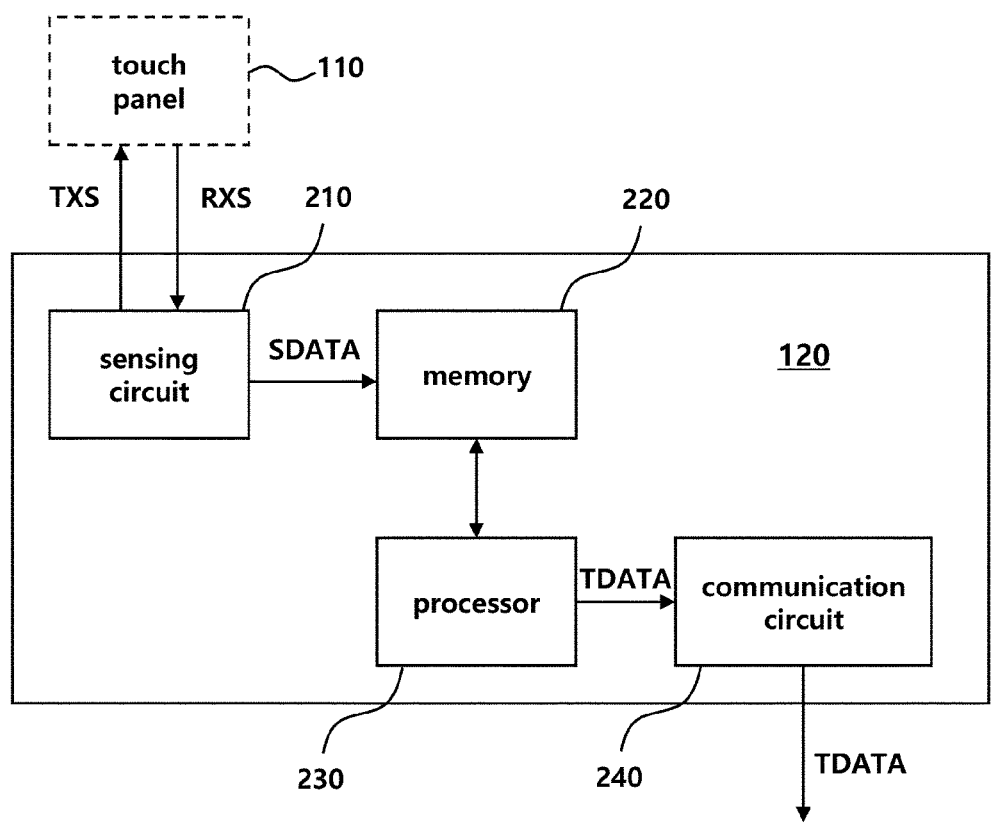
FIG. 2 is a block diagram illustrating a touch sensing device according to an embodiment.

FIG. 2 is a block diagram illustrating a touch sensing device according to an embodiment.

Referring to FIG. 2, the touch sensing device 120 may include a sensing circuit 210, a memory 220, a processor 230, and a communication circuit 240.

The sensing circuit 210 may transmit a driving signal TXS to the touch panel 110 and generate sensing values of touch cells arranged on the touch panel 110 according to a response signal RXS corresponding to the driving signal TXS.

The sensing circuit 210 may transmit the driving signal TXS in a square wave form, a sine wave form, or a triangle wave form to the touch panel 110. To this end, the sensing circuit 210 may include a driving circuit for generating the driving signal TXS.

The sensing circuit 210 may receive the response signal RXS corresponding to the driving signal TXS from the touch panel 110 and generate a sensing value for a touch cell using the response signal RXS. For example, the sensing circuit 210 may include an integration circuit for integrating the response signal RXS, an Analog Digital Converter (ADC) circuit for converting an output of the integration circuit into a digital signal, and the like, and may generate a digitalized sensing value through the output of the ADC circuit.

The digitalized sensing value may be included in sensing data SDATA and transmitted to the memory 220. The memory 220 may store sensing values included in the sensing data SDATA.

The memory 220 may temporarily store various pieces of data used during a process of generating touch data TDATA, and the stored data may be accessed by the sensing circuit 210, the processor 230, and the communication circuit 240.

The processor 230 may generate touch data TDATA including a touch coordinate from the sensing value of each touch cell included in the sensing data SDATA.

The communication circuit 240 may transmit the touch data TDATA including the touch coordinate to an external device, for example, the host.

The processor 230 may assign a group label to each touch cell. The group label may be understood as a label assigned to a group of touch cells corresponding to one object. For example, when two objects including an index finger and a middle finger touch the touch panel, a group label corresponding to 1 may be assigned to touch cells corresponding to the index finger, and a group label corresponding to 2 may be assigned to touch cells corresponding to the middle finger.

After the group labels are assigned, the processor 230 may calculate a touch coordinate for each touch cell having the same group label. For example, the processor 230 may calculate a touch coordinate for touch cells having the group label of 1 and calculate a touch coordinate for touch cells having the group label of 2. The touch sensing device may calculate the touch coordinate on the basis of a location of a touch cell having the largest sensing value among the touch cells in the corresponding group but may calculate the touch coordinate through a method of putting a plurality of sensing values into preset curves to find the highest point.

When a plurality of touch coordinates are calculated in one touch frame, the touch sensing device may transmit all of the plurality of touch coordinates to an external device or transmit only some touch coordinates thereof to the external device. For example, when it is determined that some touch coordinates correspond to an unintended touch according to a palm rejection algorithm, the touch sensing device may transmit the remaining touch coordinates other than the corresponding touch coordinates to the external device.

The processor 230 may assign a group label to each touch cell according to a Connected Component Labeling (CCL) method. While the conventional connected component labeling method may further perform an object separation process after assigning a group label to each touch cell so as to divide some groups, the touch sensing device according to an embodiment may divide groups simultaneously with a process of assigning group labels, and thus the method according to an embodiment is more rapid and more efficient than the prior art.

Prior to additional description, an arrangement of touch cells which can be applied to data processing according to an embodiment is first described.

Figure 3:
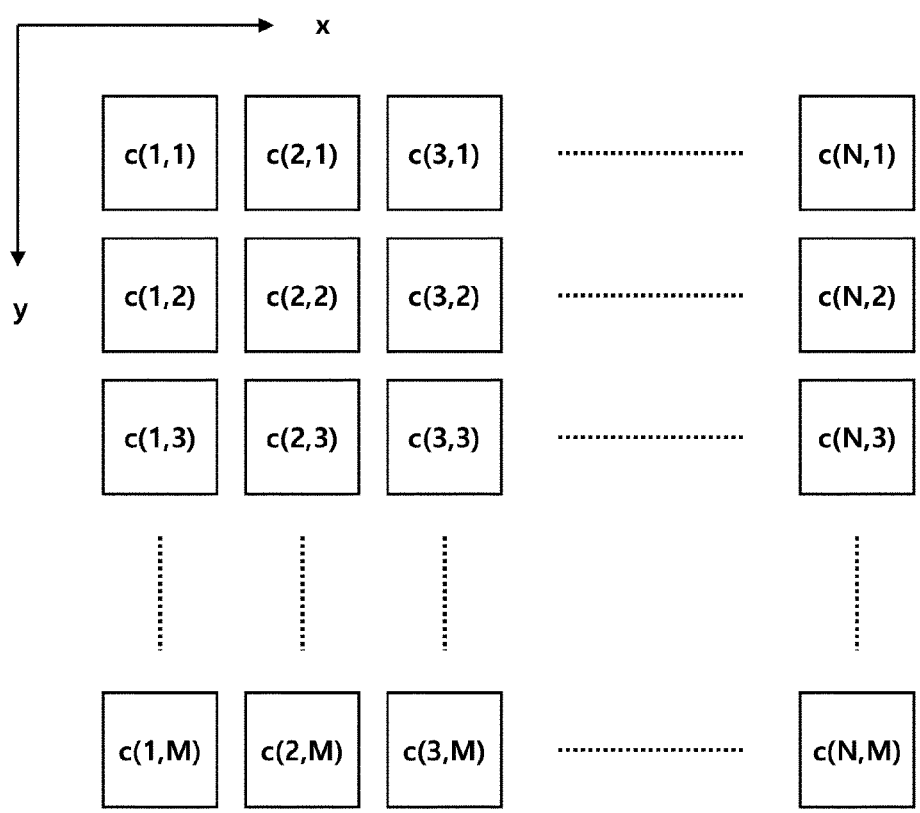
FIG. 3 is a diagram illustrating an arrangement of touch cells according to an embodiment.

FIG. 3 is a diagram illustrating arrangement of touch cells according to an embodiment.

Touch cells may be disposed or arranged on the touch panel. In the mutual capacitive type, the touch cells may be arranged at an intersection point of the transmission electrode and the reception electrode and may be arranged in the form of a matrix on an entire touch panel. In the self-capacitive type, the touch electrode to which the driving signal is supplied may be the touch cell, and may be arranged in the form of a matrix on an entire touch panel.

The term "touch cell" used in the specification may be an arrangement or disposition on the touch panel in a physical structure as described above, or a virtual touch cell corresponding to a physical touch cell. A touch cell to be sensed may be a physical touch cell, and some touch cells used for calculation may be virtual touch cells stored in a memory to correspond to the physical touch cells.

Referring to FIG. 3, touch cells $c(1,1)$ to $c(N,M)$ may be arranged in a first direction x and a second direction y and configure a matrix form. The touch sensing device may generate sensing values of the touch cells $c(1,1)$ to $c(N,M)$ using a response signal received from the touch panel and store the same in the memory. For example, the touch sensing device may store the sensing values in N×M arrangement, and a sensing value stored in (x,y) in such arrangement may be a sensing value of the touch cell located in (x,y).

When sensing of the touch panel is completed in one touch frame, sensing values may be stored in the memory, and the touch sensing device may assign a group label to each touch cell and generate a touch coordinate while scanning the sensing values for the memory. The scanning may be scanning of a virtual touch cell stored in the memory rather than scanning of a physical touch cell on the touch panel.

The touch sensing device may scan touch cells in a raster scan direction. The raster scan direction may be, for example, a combination of the first direction x and the second direction y. The touch sensing device may perform the scan line by line in the first direction x. When the scanning of one line is completed, the touch sensing device may change the line in the second direction y to scan the touch cells.

The same group label may be assigned to adjacent touch cells corresponding to one object. For example, when $c(2,1)$ and $c(2,2)$ are touched by the index finger, the same group label may be assigned to $c(2,1)$ and $c(2,2)$. Here, two adjacent touch cells may mean that no touch cell is disposed between the two touch cells. Eight touch cells may be adjacent touch cells in the matrix structure, in which the touch cells are located in top left, top, top right, left, right, bottom left, bottom, and bottom right directions from one touch cell disposed in the center.

Figure 4:
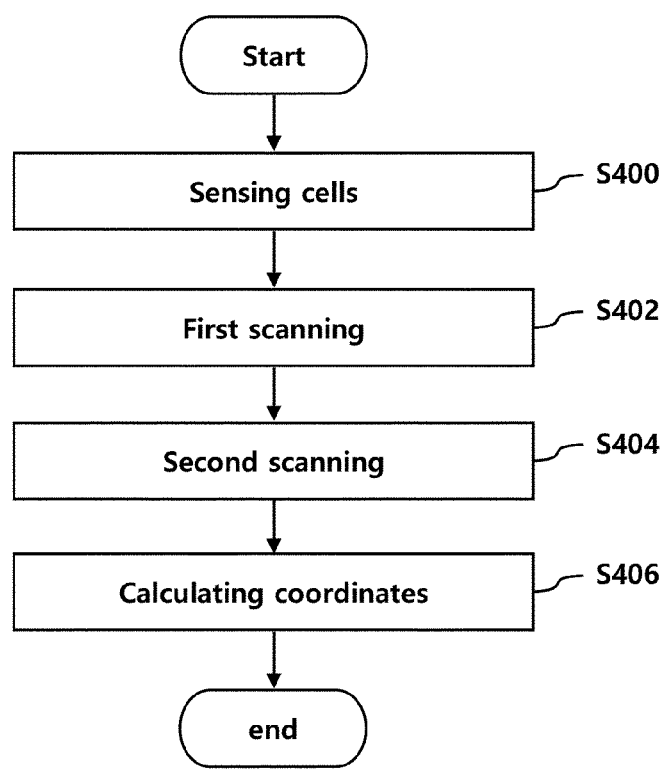
FIG. 4 is a flowchart illustrating a touch sensing method according to an embodiment.

FIG. 4 is a flowchart illustrating a touch sensing method according to an embodiment.

Referring to FIG. 4, the touch sensing device may generate and store a sensing value for each touch cell in S400.

The touch sensing device may perform a first scan for touch cells. The touch sensing device may assign group labels to touch cells having sensing values larger than or equal to a first threshold value, and classify touch cells having a sensing value difference with the adjacent touch cells as a valley, the sensing value difference being larger than or equal to a second threshold value in S402.

The touch sensing device may perform a second scan for the touch cells. In the second scan, the touch sensing device may make group labels of the adjacent touch cells among the touch cells to which the group labels are assigned be the same in S404.

The touch sensing device may calculate touch coordinates for respective touch cells having the same group label in S406.

The touch sensing device may transmit some or all of the calculated touch coordinates to the external device.

Figure 5:
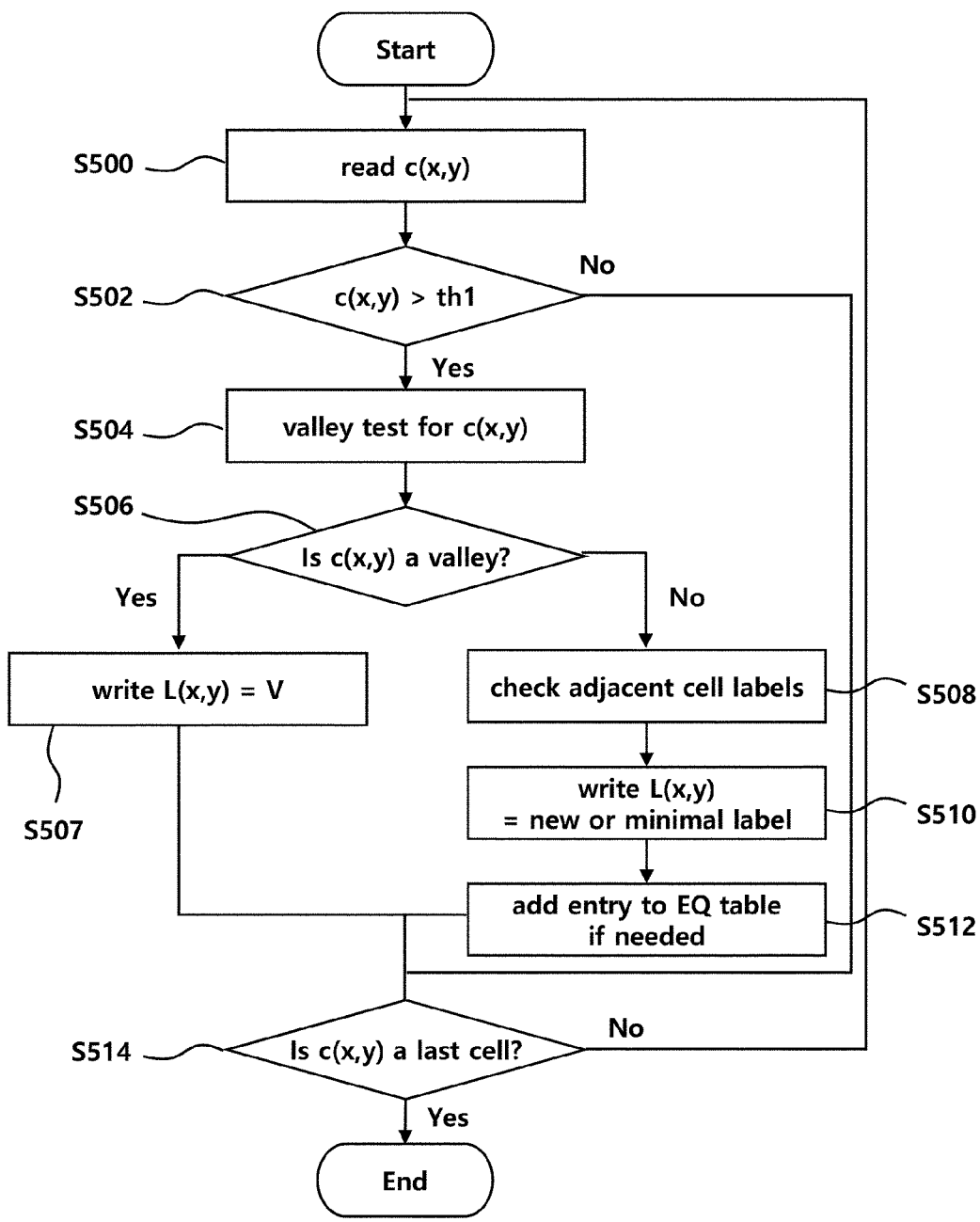
FIG. 5 is a flowchart illustrating a first scan according to an embodiment.

FIG. 5 is a flowchart of the first scan according to an embodiment.

Referring to FIG. 5, the touch sensing device may read sensing values of touch cells one by one according to a scan order in a raster scan direction in S500.

The touch sensing device may compare a sensing value of a touch cell $c(x,y)$ to be scanned with a first threshold value th1. When the sensing value is smaller than or equal to the first threshold value th1 (No of S502), the touch sensing device may move the touch cell to be scanned to the next touch cell.

In order to move the touch cell to the next touch cell, the touch sensing device may identify whether the touch cell $c(x,y)$ to be scanned is the last touch cell in S514 and, when the touch cell is not the last touch cell (No of S514), may read a sensing value of the next touch cell $c(x+1,y)$ or $c(1,y+1)$ (repeat the process from S500).

When the sensing value of the touch cell $c(x,y)$ to be scanned is larger than or equal to the first threshold value th1 (Yes of S502), the touch sensing device may perform a valley test on the touch cell $c(x,y)$ in S504.

The valley test may be a process of determining whether the touch cell $c(x,y)$ corresponds to a valley. When touch cells having the same group label are touch cell group, the valley may correspond to a boundary between two adjacent touch cell groups. A touch cell corresponding to the valley is on the boundary of touch cell groups, and thus the sensing value thereof may be larger than or equal to the first threshold value. Further, the touch cell corresponding to the valley may have a sensing value difference with the adjacent touch cells, the sensing value difference being larger than or equal to a second threshold value.

The touch sensing device may calculate the sensing value difference between the touch cell $c(x,y)$ to be scanned and the adjacent touch cell, compare the difference with the second threshold value, and determine whether the touch cell $c(x,y)$ to be scanned is the valley.

Figure 6:
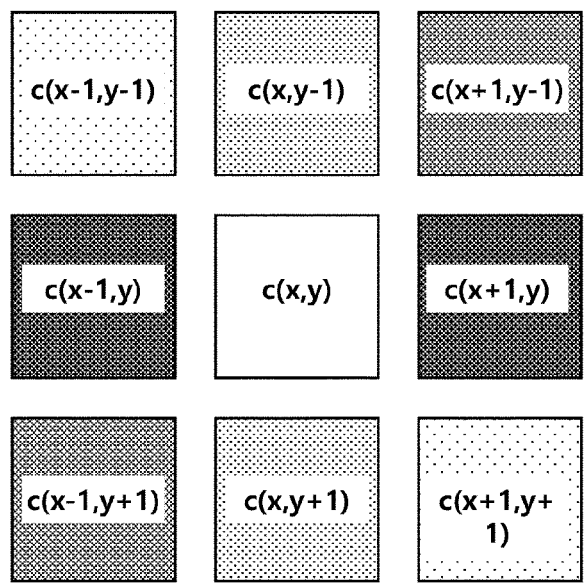
FIG. 6 illustrates touch cells adjacent to a touch cell to be scanned.

FIG. 6 illustrates touch cells adjacent to a touch cell to be scanned.

Referring to FIG. 6, the touch cell $c(x,y)$ to be scanned may be adjacent to a top cell $c(x,y-1)$ and a bottom cell $c(x,y+1)$ in a vertical direction of the drawing. The touch sensing device may calculate a first difference value by subtracting the sensing value of the touch cell $c(x,y)$ to be scanned from the sensing value of the top cell $c(x,y-1)$ and calculate a second difference value by subtracting the sensing value of the touch cell $c(x,y)$ to be scanned from the sensing value of the bottom cell $c(x,y+1)$. Further, when the first difference value and the second difference value are larger than or equal to the second threshold value, the touch sensing device may classify the touch cell $c(x,y)$ to be scanned as the valley.

The touch sensing device may perform a valley test in all of vertical, horizontal, and diagonal directions.

For example, the touch sensing device may calculate a first difference value by subtracting the sensing value of the touch cell $c(x,y)$ to be scanned from the sensing value of the left cell $c(x-1,y)$ and calculate a second difference value by subtracting the sensing value of the touch cell $c(x,y)$ to be scanned from the sensing value of the right cell $c(x+1,y)$. Further, when the first difference value and the second difference value are larger than or equal to the second threshold value, the touch sensing device may classify the touch cell $c(x,y)$ to be scanned as the valley.

The touch sensing device may calculate a first difference value by subtracting the sensing value of the touch cell $c(x,y)$ to be scanned from the sensing value of the top left cell $c(x-1,y-1)$ and calculate a second difference value by subtracting the sensing value of the touch cell $c(x,y)$ to be scanned from the sensing value of the bottom right cell $c(x+1,y+1)$. Further, when the first difference value and the second difference value are larger than or equal to the second threshold value, the touch sensing device may classify the touch cell $c(x,y)$ to be scanned as the valley.

The touch sensing device may calculate a first difference value by subtracting the sensing value of the touch cell $c(x,y)$ to be scanned from the sensing value of the bottom left cell $c(x-1,y+1)$ and calculate a second difference value by subtracting the sensing value of the touch cell $c(x,y)$ to be scanned from the sensing value of the top right cell $c(x+1,y-1)$. Further, when the first difference value and the second difference value are larger than or equal to the second threshold value, the touch sensing device may classify the touch cell $c(x,y)$ to be scanned as the valley.

When a difference between the sensing value of the touch cell $c(x,y)$ to be scanned and the sensing values of the adjacent touch cells is larger than or equal to the second threshold value in four directions, the touch sensing device may classify the corresponding touch cell as the valley.

Referring back to FIG. 5, when the touch cell $c(x,y)$ to be scanned is classified as the valley (Yes of S506), the touch sensing device may assign a label indicating the valley to the corresponding touch cell in S507. The label may be stored in an array separated from the sensing value, and a label stored in $L(x,y)$ may be processed as, for example, a label for the touch cell $c(x,y)$. A label indicating the valley may be, for example, the character "V" but it is only an example.

When the touch cell $c(x,y)$ to be scanned is not classified as the valley (No of S506), a group label may be assigned to the touch cell $c(x,y)$ to be scanned according to a connected component labeling method in S508 and S510.

The touch sensing device may identify group labels of touch cells adjacent to the touch cell $c(x,y)$ to be scanned in S508 The touch sensing device may identify only touch cells to which group labels are assigned rather than identifying all of the adjacent touch cells in order to perform rapid and efficient processing. For example, the touch sensing device may identify group labels of four touch cells among eight touch cells adjacent to the touch cell $c(x,y)$ to be scanned according to an 8-connected component labeling method. The four touch cells are touch cells scanned earlier than the touch cell $c(x,y)$ to be scanned in a raster scan direction. In another example, the touch sensing device may identify group labels of two touch cells among the four touch cells adjacent to the touch cell $c(x,y)$ to be scanned according to a 4-connected component labeling method. The two touch cells are touch cells scanned earlier than the touch cell $c(x,y)$ to be scanned in a raster scan direction.

Locations of the adjacent touch cells of which the group labels are identified are described in more detail with reference to FIGS. 7 and 8.

Figure 7:
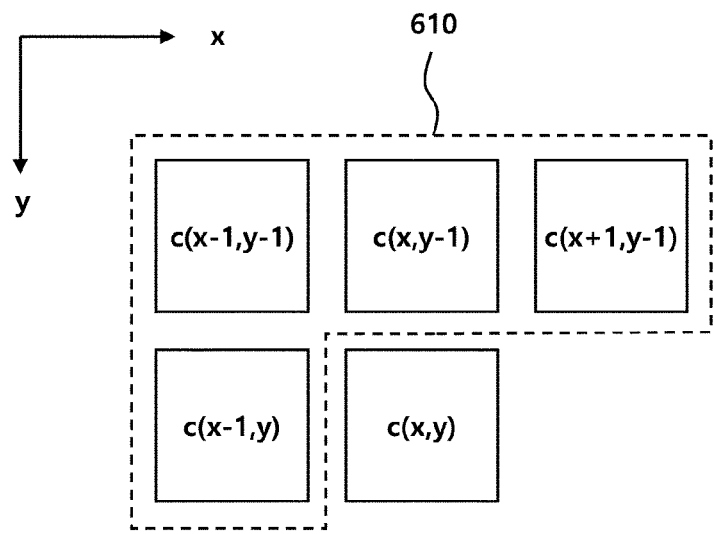
FIG. 7 illustrates four adjacent touch cells of which group labels are identified by an 8-connected component labeling method.

FIG. 7 illustrates four adjacent touch cells of which group labels are identified by the 8-connected component labeling method.

Referring to FIG. 7, one line is scanned in a first direction x according to a raster scan direction and a selected line is moved in a second direction y. According to such a scan direction, there may be a possibility of assigning group labels to three adjacent touch cells c(x−1,y−1), c(x,y−1), and c(x+1,y−1) in an upper row and one adjacent touch cell c(x−1,y) in the left side of the touch cell in the same row among touch cells adjacent to the touch cell c(x,y) to be scanned. The touch sensing device may identify group labels of the four touch cells.

Figure 8:
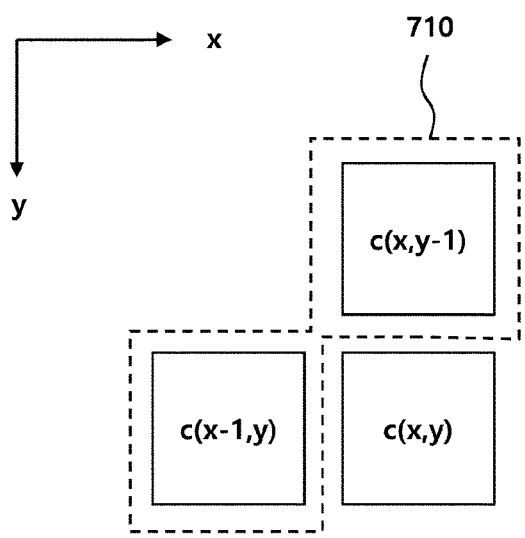
FIG. 8 illustrates two adjacent touch cells of which group labels are identified by a 4-connected component labeling method.

FIG. 8 illustrates two adjacent touch cells of which group labels are identified by the 4-connected component labeling method.

Referring to FIG. 8, one line is scanned in a first direction x according to a raster scan direction and a selected line is moved in a second direction y. According to such a scan direction, there may be a possibility of assigning group labels to one adjacent touch cell c(x,y−1) in the top side and one adjacent touch cell c(x−1,y) in the left side among touch cells adjacent to the touch cell c(x,y) to be scanned. The touch sensing device may identify group labels of the two touch cells.

Referring back to FIG. 5, the touch sensing device may identify group labels of touch cells adjacent to the touch cell c(x,y) to be scanned in S508 and determine a group label corresponding to the touch cell c(x,y) to be scanned in S510.

Group labels assigned to the touch cells adjacent to the touch cell c(x,y) to be scanned may correspond to the following three cases.

Case 1) no label is assigned to all of the adjacent touch cells

Case 2) one group label is assigned to some or all of the adjacent touch cells

Case 3) two or more group labels are assigned to the adjacent touch cells

In Case 1), the touch sensing device may assign a new group label which was never issued before to the touch cell c(x,y) to be scanned. In Case 2), the touch sensing device may assign one group label identified in the adjacent touch cells to the touch cell c(x,y) to be scanned.

In Case 3), the touch sensing device may select one group label by a specific rule from among two or more group labels and assign the selected group label to the touch cell c(x,y) to be scanned. The specific rule may be, for example, a rule for selecting a minimum value or a maximum value. When the specific rule is a rule for selecting a minimum value, the touch sensing device may select one group label having a minimum value from among the two or more group labels and assign the selected group label to the touch cell c(x,y) to be scanned.

Case 3) may be actually a case indicating that two or more group labels are connected on the basis of the touch cell c(x,y) to be scanned. When the connected touch cells have different group labels, the touch sensing device may make the group labels be the same through a second scan. At this time, the touch sensing device may store group labels connected to each other in an Equivalent (EQ) table in order to use the same for the second scan.

When Case 3) is identified, the touch sensing device may store different group labels having connectivity in the EQ table according to a specific rule in S512. For example, when group labels u and v have connectivity, the specific rule may be a rule for inserting a flag into E(u,v), a rule for arranging a smaller group label in a first row and a larger group label in a second row among u and v, or an inverse rule.

The touch sensing device may repeatedly perform the process on all touch cells.

According to the first scan, objects may be separated and labeled through a valley determination process without any object separation process. When the first scan has finished, the touch sensing device may perform the second scan in order to make the group label having connectivity be the same.

Figure 9:
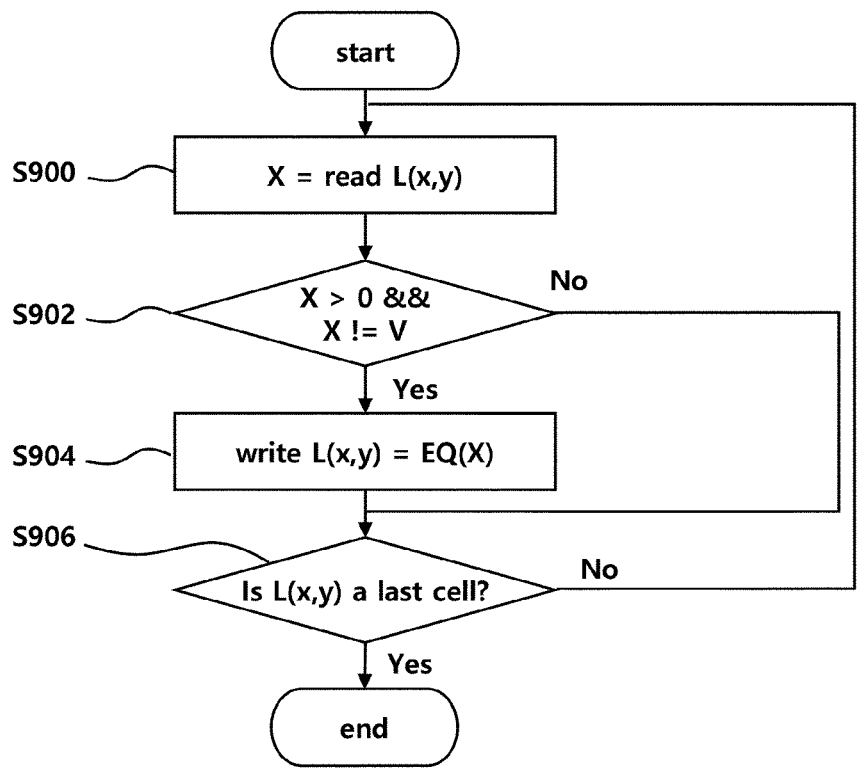
FIG. 9 is a flowchart illustrating a first example of a second scan according to an embodiment.

FIG. 9 is a flowchart illustrating a first example of the second scan according to an embodiment.

Referring to FIG. 9, the touch sensing device may read a label parameter L(x,y) of the touch cell to be scanned as X in S900.

When X is neither a specific label, for example, 0 nor a label V indicating a valley (Yes of S902), the touch sensing device may search for a group label having connectivity with X in the EQ table and update the label parameter L(x,y) of the touch cell to be scanned in S904.

The touch sensing device may repeat the above-described process on all touch cells through operation S906 for testing whether the touch cell is the last touch cell.

Figure 10:
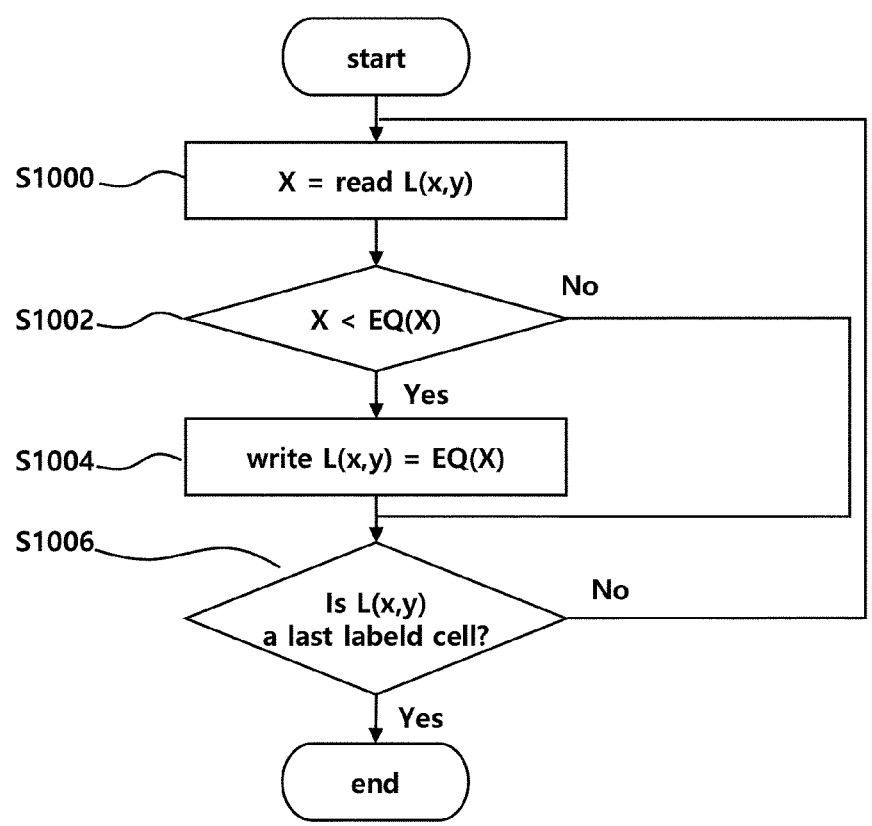
FIG. 10 is a flowchart illustrating a second example of the second scan according to an embodiment.

FIG. 10 is a flowchart illustrating a second example of the second scan according to an embodiment.

Referring to FIG. 10, the touch sensing device may read a label parameter L(x,y) of the touch cell to be scanned as X in S1000.

When a group label having connectivity with X is stored in the EQ table, for example, when a value stored in accordance with X in the EQ table is larger than X (Yes of S1002), the touch sensing device may update the label parameter L(x,y) of the touch cell to be scanned to the value stored in the EQ table in S1004.

Such a process may be performed only on a touch cell to which a group label is assigned, and the touch sensing device may repeat the above-described process on all touch cells to which group labels are assigned through operation S1006 for testing whether the touch cell is the last touch cell to which the group label is assigned.

According to the above-described embodiment, the touch sensing device may more rapidly, effectively, and efficiently process the touch sensing value than the prior art. In order to verify the same, a test has been performed and a process and result of the test are described with reference to FIGS. 11 to 13.

Figure 11:
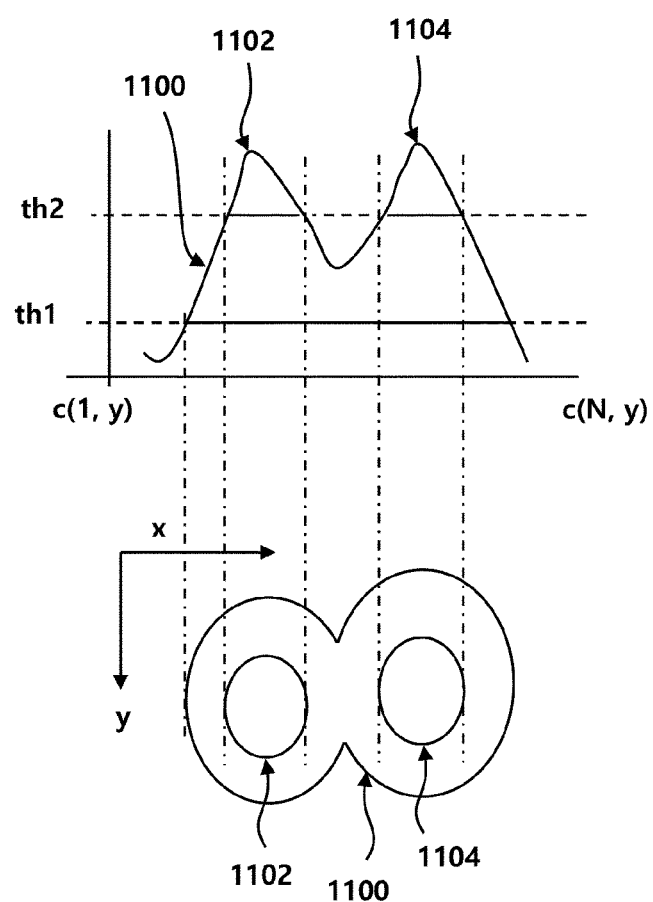
FIG. 11 illustrates a touch cell sensing value when two objects are located close to each other.

FIG. 11 illustrates a touch cell sensing value when two objects are located close to each other.

Referring to FIG. 11, when two objects are located close to each other, an area of a touch cell having a sensing value larger than or equal to a first threshold value th1 may be widely indicated as a first area 1100. When a touch coordinate is calculated for the entire first area 1100, an accurate touch coordinate cannot be obtained, and thus the touch sensing device is required to separate the two objects corresponding to the first area 1100.

To this end, a process of scanning the first area 1100 again and splitting the first area 1100 into a second area 1102 and a third area 1104 on the basis of a second threshold value is further performed in the prior art, but the additional process makes a problem of increasing a processing time.

Figure 12:
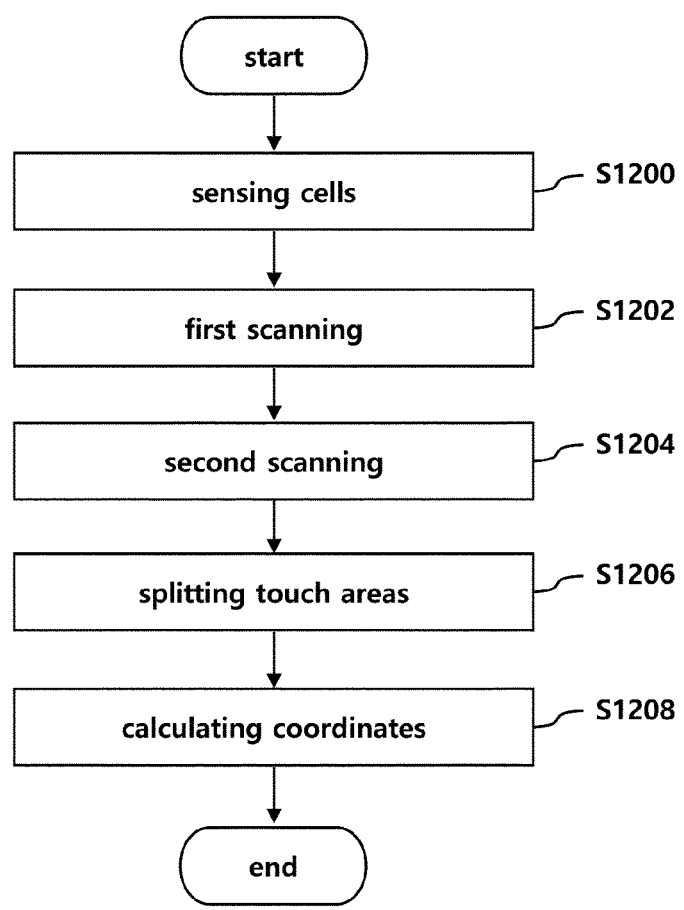
FIG. 12 is a flowchart illustrating a touch sensing method which is assumed as the prior art.

FIG. 12 is a flowchart illustrating a touch sensing method which is assumed as the prior art.

Referring to FIG. 12, in the touch sensing method which is assumed as the prior art, sensing values for touch cells are generated in S1200 and group labels are assigned through a first scan in S1202. Further, in the touch sensing method which is assumed as the prior art, group labels having connectivity are made to be the same through a second scan in S1204.

In addition, in the touch sensing method which is assumed as the prior art, a touch coordinate is calculated in S1208 after operation S1206 for splitting a touch area in order to separate objects is further performed.

FIG. 13 is a table showing a test result of a processing time of a method according to an embodiment and a method which is assumed as the prior art.

Referring to FIG. 13, when five fingers are touched, the method which is assumed as the prior art (old solution) calculates the touch coordinates in the unit time of 1.77, but the method according to an embodiment (new solution) calculates the touch coordinates in the unit time of 0.51, thereby achieving an efficiency improvement of 71.1%. Further, when ten fingers are touched, the method which is assumed as the prior art (old solution) calculates the touch coordinates in the unit time of 4.41, but the method according to an embodiment (new solution) calculates the touch coordinates in the unit time of 2.28, thereby achieving an efficiency improvement of 48.3%.

As noted in the test result, according to the embodiment, the touch sensing device can more rapidly, effectively, and efficiently process touch sensing values than the prior art.

What is claimed is:

1. A touch sensing device comprising:
   a sensing circuit configured to generate a sensing value for each touch cell; and
   a processor configured to, among touch cells, each having a sensing value larger than or equal to a first threshold value, classify touch cells, each having a sensing value difference of at least a second threshold value with adjacent touch cells, as a valley, to assign a same group label to touch cells which are not classified as the valley and are adjacent to each other in a first scan, in a case when group labels of at least two touch cells adjacent to a touch cell being scanned are different in the first scan, to determine one among the different group labels as a group label of the touch cell being scanned in a first scan, to store the different group labels in an equivalent (EQ) table, and to make group labels of adjacent touch cells to conform to each other according to the EQ table in the second scan.

2. The touch sensing device of claim 1, wherein the processor classifies touch cells, each having both a sensing value difference of at least the second threshold value with an adjacent touch cell in one side in one direction and a sensing value difference of at least the second threshold value with another adjacent touch cell in another side in the one direction, as the valley.

3. The touch sensing device of claim 1, wherein the processor calculates touch coordinates for touch cells by group having a same group label.

4. The touch sensing device of claim 1, wherein the processor assigns a same group label to touch cells which are not classified as the valley and are adjacent to each other according to a connected component labeling (CCL) method.

5. The touch sensing device of claim 4, wherein the processor assigns a group label to each touch cell in a raster scan direction and assigns to a current touch cell a group label of a smallest number among group labels previously assigned to one adjacent touch cell in the same row as that of the current touch cell and to three adjacent touch cells in another row.

6. A touch sensing method comprising:
   generating and storing a sensing value for each touch cell;
   assigning group labels to touch cells, each having a sensing value larger than or equal to a first threshold value, classifying touch cells, each having a sensing value difference of at least a second threshold value with adjacent touch cells, as a valley in a first scan of the touch cells, in a case when group labels of at least two touch cells adjacent to a touch cell being scanned are different in the first scan, determining one among the different group labels as a group label of the touch cell being scanned and storing the different group labels in an equivalent (EQ) table; and
   making group labels of adjacent touch cells to conform to each other according to the EQ table in a second scan distinguished from the first scan.

7. The touch sensing method of claim 6, wherein a group label for a touch cell being scanned is determined by identifying group labels of touch cells adjacent to the touch cell being scanned.

8. The touch sensing method of claim 6, wherein, in a case when group labels of at least two touch cells adjacent to a touch cell being scanned are different, a minimum value among the different group labels is determined as a group label of the touch cell being scanned in a first scan.

9. The touch sensing method of claim 6, wherein a label indicating the valley is assigned to the touch cells classified as the valley in the first scan.

10. The touch sensing method of claim 6, wherein touch cells, each having a sensing value difference of at least the second threshold value with adjacent touch cells in one of vertical, horizontal, and diagonal directions, are classified as the valley in the first scan.

11. A touch sensing device comprising:
    a sensing circuit configured to supply a driving signal to a panel and generate sensing values of touch cells arranged on the panel according to a response signal corresponding to the driving signal;
    a memory configured to store the sensing values and labels corresponding to respective touch cells; and
    a processor configured to assign group labels to touch cells, each having a sensing value larger than or equal to a first threshold value, to assign a label indicating a valley to touch cells, each having a sensing value difference of at least a second threshold value with adjacent touch cells in a first scan for touch cells, in a first scan, in a case when group labels of at least two touch cells adjacent to a touch cell being scanned are different in the first scan, to determine one among the different group labels as a group label of the touch cell being scanned in a first scan, to store the different group labels in an equivalent (EQ) table, and to make group labels of adjacent touch cells to conform to each other according to the EQ table in the second scan.

12. The touch sensing device of claim 11, wherein a label corresponding to each touch cell is initialized to have a specific value, and subsequently, replaced with one of the group labels or replaced with the label indicating the valley in the first scan.

13. The touch sensing device of claim 11, wherein the processor calculates at least one touch coordinate for each of touch cells having a same group label.

14. The touch sensing device of claim 11, further comprising a communication circuit configured to transmit data to an external device, wherein the processor transmits some of the at least one touch coordinate to the external device through the communication circuit.

* * * * *